(12) United States Patent
Campbell et al.

(10) Patent No.: US 8,606,694 B2
(45) Date of Patent: Dec. 10, 2013

(54) ONLINE REGISTRATION SYSTEM FOR CROA-COMPLIANT CREDIT ADVICE SERVICES

(75) Inventors: Jay Campbell, Encinitas, CA (US); Michael Balducci, Aliso Viejo, CA (US); Jeff Mandel, Cornelius, NC (US); Marlin K. Brandt, Jr., Riverside, CA (US); Gregory T. Olson, Trabuco Canyon, CA (US)

(73) Assignee: Experian Credit Advisors, Inc., Costa Mesa, CA (US)

( * ) Notice: Subject to any disclaimer, the term of this patent is extended or adjusted under 35 U.S.C. 154(b) by 95 days.

(21) Appl. No.: 13/175,712

(22) Filed: Jul. 1, 2011

(65) Prior Publication Data

US 2012/0095894 A1 Apr. 19, 2012

Related U.S. Application Data

(60) Provisional application No. 61/361,332, filed on Jul. 2, 2010.

(51) Int. Cl.
*G06Q 40/02* (2012.01)

(52) U.S. Cl.
USPC .............................. 705/38; 705/35

(58) Field of Classification Search
USPC .............................. 705/35, 38–39
See application file for complete search history.

(56) References Cited

U.S. PATENT DOCUMENTS

| | | | |
|---|---|---|---|
| 5,978,780 A | 11/1999 | Watson | |
| 6,962,336 B2 | 11/2005 | Glass | |
| 7,181,418 B1 | 2/2007 | Zucker et al. | |
| 7,249,076 B1 | 7/2007 | Pendleton et al. | |
| 7,310,611 B2* | 12/2007 | Shibuya et al. | 705/26.81 |
| 7,315,837 B2 | 1/2008 | Sloan et al. | |
| 7,356,516 B2 | 4/2008 | Richey et al. | |
| 7,409,369 B1 | 8/2008 | Homuth et al. | |
| 7,475,032 B1 | 1/2009 | Patnode et al. | |
| 7,756,789 B2 | 7/2010 | Welker et al. | |
| 7,792,715 B1 | 9/2010 | Kasower | |
| 7,814,005 B2 | 10/2010 | Imrey et al. | |
| 7,818,228 B1 | 10/2010 | Coulter | |
| 7,970,679 B2 | 6/2011 | Kasower | |
| 8,195,549 B2 | 6/2012 | Kasower | |
| 8,271,393 B2* | 9/2012 | Twining et al. | 705/64 |
| 2002/0010616 A1 | 1/2002 | Itzaki | |
| 2002/0059139 A1 | 5/2002 | Evans | |
| 2002/0077964 A1 | 6/2002 | Brody et al. | |
| 2002/0111890 A1 | 8/2002 | Sloan et al. | |

(Continued)

OTHER PUBLICATIONS

"Credit Repair | Credit Score Improvement Help | CreditRepair. com." Credit Repair | Credit Score Improvement Help | CreditRepair. com. Mar. 10, 2010 <http://web.archive.org/web/20100310134914/http://www.creditrepair.com/credit/>. Retrieved Mar. 22, 2013 (2 pages).*

(Continued)

*Primary Examiner* — Elda Milef
(74) *Attorney, Agent, or Firm* — Knobbe, Martens, Olson & Bear LLP

(57) ABSTRACT

Systems and methods for registering consumers for credit repair counseling may include use of electronic signatures and/or authorizations, electronic delivery of documents (e.g., consent and cancellation forms), automated scheduling in accordance with federal and/or state waiting periods, and/or consumer-selectable credit repair topics, among other features.

21 Claims, 10 Drawing Sheets

(56) References Cited

U.S. PATENT DOCUMENTS

| | | | |
|---|---|---|---|
| 2002/0173994 A1 | 11/2002 | Ferguson, III | |
| 2003/0028466 A1 | 2/2003 | Jenson et al. | |
| 2003/0028477 A1 | 2/2003 | Stevenson et al. | |
| 2003/0163435 A1 | 8/2003 | Payone | |
| 2003/0208412 A1 | 11/2003 | Hillestad et al. | |
| 2004/0111359 A1 | 6/2004 | Hudock | |
| 2004/0243508 A1* | 12/2004 | Samson et al. | 705/38 |
| 2005/0027632 A1 | 2/2005 | Zeitoun et al. | |
| 2006/0223043 A1 | 10/2006 | Dancy-Edwards et al. | |
| 2007/0112668 A1 | 5/2007 | Celano et al. | |
| 2007/0156554 A1 | 7/2007 | Nikoley et al. | |
| 2007/0220003 A1 | 9/2007 | Chern et al. | |
| 2007/0299770 A1 | 12/2007 | Delinsky | |
| 2008/0021802 A1 | 1/2008 | Pendleton | |
| 2008/0086400 A1 | 4/2008 | Ardelean et al. | |
| 2008/0270295 A1 | 10/2008 | Lent et al. | |
| 2009/0048957 A1 | 2/2009 | Celano | |
| 2009/0198557 A1 | 8/2009 | Wang et al. | |
| 2009/0198602 A1 | 8/2009 | Wang et al. | |
| 2009/0276368 A1 | 11/2009 | Martin et al. | |
| 2009/0280467 A1 | 11/2009 | Ahart | |
| 2010/0009320 A1 | 1/2010 | Wilkelis | |
| 2010/0009332 A1 | 1/2010 | Yaskin et al. | |
| 2010/0023434 A1* | 1/2010 | Bond | 705/35 |
| 2010/0030677 A1 | 2/2010 | Melik-Aslanian et al. | |
| 2010/0036697 A1 | 2/2010 | Kelnar | |
| 2010/0094774 A1 | 4/2010 | Jackowitz et al. | |
| 2011/0166988 A1 | 7/2011 | Coulter | |
| 2011/0270618 A1* | 11/2011 | Banerjee et al. | 705/1.1 |

OTHER PUBLICATIONS

Romig, Shane. "The Truth About Credit Repair". <http://credit.com>. May 5, 2010 <http://credit.com/credit_information/credit_help/The-Truth-About-Credit-Repair.jsp>. Retrieved Mar. 22, 2013. (4 pages).*

"Managing Debt? | Consumer Information". Federal Trade Commission. Dec. 2005. <http://www.consumer.ftc.gov/articles/0158-managing-debt{Mar. 22, 2013 7:26:29 AM]> (4 pages).*

CreditKarma, http://www.creditkarma.com printed Feb. 8, 2013 in 2 pages.

CreditSesame, http://www.creditsesame.com/how-it-worksjour-technology/ printed.Feb. 5, 2013 in 2 pages.

Collins, Michael J., "Exploring the Design of Financial Counseling for Mortgage Borrowers in Default," Journal of Family and Economic Issues, Springer Science+Business Media, Mar. 13, 2007, pp. 207-226.

Credit Plus, Inc.; "Score Wizard" [online] [retrieved on Jun. 13, 2007] Retrieved from the internet http://web.archive.org/web/20030806080310/www.creditplus.com/scorewizard.asp Nov. 27, 2002 & Mar. 23, 2003.

"Debt Settlement: Watch Video on how to Pay Your Debt Faster", http://www.debtconsolidationcare.com/debt-settlement.html printed Jan. 9, 2013 in 6 pages.

Demby, Elayne, "Special Report: Letting Consumers Know the Score- and More", Collections and Credit Risk, New York, Feb. 2003, vol. 8, Issue 2, p. 53, pp. 3.

Elliehausen et al., The Impact of Credit Counseling on Subsequent Borrower Behavior, The Journal of Consumer Affairs, Summer 2007, vol. 41, No. 1, pp. 1-28.

Hunt, Robert M.; Whither Consumer Credit Counseling? Business Review, Dec. 31, 2005, pp. 9-20.

"Judging Credit: Consumers Need Better Finance Tools", News Journal, Daytona Beach, FL, Dec. 28, 2002.

Mint.com, http://www.mint.com/how-it-works/ printed Feb. 5, 2013 in 2 pages.

Planwise, http://planwise.com printed Feb. 8, 2013 in 5 pages.

"Qualifying for Debt Settlement", http://www.certifieddebt.com/debt/settlement-qualifications.shtml printed Jan. 9, 2013 in 2 pages.

"Resolve Debt for Less: With Help from Freedom Financial" http://www.debtsettlementusa.com/ printed Jan. 9, 2013 in 6 pages.

"Settling Your Debts—Part 1 in Our Debt Settlement Series", http://www.creditinfocenter.com/debt/settle_debts.shtml printed Jan. 9, 2013 in 6 pages.

* cited by examiner

FIG. 2A

John Smith's Homepage
Membership ID#: 894567 (Edit Account) | View Your Report Dated 12/25/2008 | Refresh Your Report Free with Membership | Upgrade to a 3-Bureau Report Introducing Member Rewards by freecreditreport.com. Rewards you've earned. Savings you deserve. Learn More ⊗

Member Resources
- My Credit Report
- Monthly Credit Statement
- ChildSecure
- CardSafe
- Member Rewards New!
- Loan Assistance
- Credit Education
- Calculators
- Dispute Guide
- Glossary

Helpful Information
- Frequently Asked Questions
- Product Guarantee
- About freecreditreport.com

Contact Us
- Customer Care
- Fraud Resolution Assistance

A Good Credit Score can Save You More!

EXPERIAN CREDIT ADVISORS
Provided by iQual Corporation

Your Credit Score | Visit Score Center>

Track your score history, learn how credit Scores are determined and see how you may potentially impact your score.

642

Score Date: 04/21/2009 (View Details)

830
730
630
530
430
330
[642]

View Full Size Graph >
OCT NOV DEC JAN FEB MAR

**You have more *unviewed Alerts*.** | Visit Alerts Center>

Alerts let you to see key changes to all 3 of your National Credit Reports. Alerts Emailed to: john@email.com (Edit)

⚠ Potentially Negative Alert
Balance Date: 10/21/2009

Company: Wells Fargo
Current Balance: $2,785.00
Status Date: 10/15/2009
Payment Status: 30 Days Late
Company Phone: (949) 555-1212
Company Address: 123 Main St.,
Suite #405
Omaha, NE 12345

Alert Reported by Experian

If you believe this Alert is inaccurate, you may file a dispute.

Dispute Center >

Experian Credit Advisors

Your Appointment with a Credit Advisor has been scheduled.
During your appointment, your advisor will reference your Experian Credit Report. For your convenience, here is a direct link to that version of your Credit Report.

View your MM/DD/YY Experian Credit Report with Score

EXPERIAN CREDIT ADVISORS
Provided by iQual Corporation

210

Choose My Service   Schedule My Appointment   Accept Legal Terms   Submit My Order

Choose My Service

Do you have questions about your Experian Credit Report and Score? Not sure what to do next? The well-trained Credit Advisors at iQual are here to help. Simply select a service and schedule an appointment to talk with a Credit Advisor.

☐ Quick Credit Q&A - $19.95  Up to 10 minutes
Choose this option if you understand credit situation but need a few details explained.
- Get answers to specific questions about your personal Experian Credit Report ☐ Credit Assessment - $39.95  Up to 25 minutes
Choose this option if you want a guided tour and an expert's appraisal of your credit.
- Get answers to specific questions about your personal Experian Credit Report
- Get a guided tour of your Experian Credit Score
- Get an expert's assessment of your Experian Credit Score
- Review open loans, credit cards, and other accounts on your Credit Report ☐ Personalized Credit Advice - $79.95  Up to 45 minutes
Choose this option if you'd like practical advice on how you might improve your credit.
- Get answers to specific questions about your personal Experian Credit Report
- Get a guided tour of your Experian Credit Score
- Get an expert's assessment of your Experian Credit Score
- Review open loans, credit cards, and other accounts on your Credit Report
- Understand the factors contributing to your Credit Score
- Learn which actions might positively affect your Credit Score
- Discuss your credit-related goals and get advice for achieving them

[ Continue ]

How Does It Work?
1. Choose a service, schedule your appointment, and complete your order.
2. You'll receive an email confirmation with instructions and documents.
3. Your Advisor will review your Experian Credit Report, and call you when it's time for your appointment.

Customer Support
Call Toll-Free: %%PHONE%%
Phone Hours (PST)
Mon - Fri from 6am - 6pm
Sat - Sun from 8am - 5pm

Security
Experian Credit Advisors and iQual are committed to protecting your information and privacy. All communications are secure and confidential.

FIG. 4

Choose My Service    Schedule My Appointment    Accept Legal Terms    Submit My Order

Accept Legal Terms

Consent to Electronic Documents                                        Print Lorem ipsum dolor sit amet, consectetur adipiscing elit. Ut luctus sodales nunc nec dignissm vitae congue odio. Suspendisse luctus ultrices eros, et iaculis risus mollis nec. Duis id ante mi tempus vulputate ut eget quam. Etiam commodo laoreet purrus sit amet scelerrisque. Curabitur consequat euismod. Morbi mi mauris, commodo sed dignissm vitae, consectur ut arcu. Integer

Acknowledgment of Rights                                               Print Lorem ipsum dolor sit amet, consectetur adipiscing elit. Ut luctus sodales nunc nec dignissm vitae congue odio. Suspendisse luctus ultrices eros, et iaculis risus mollis nec. Duis id ante mi tempus vulputate ut eget quam. Etiam commodo laoreet purrus sit amet scelerrisque. Curabitur consequat euismod. Morbi mi mauris, commodo sed dignissm vitae, consectur ut arcu. Integer

Service Contract                                                       Print Lorem ipsum dolor sit amet, consectetur adipiscing elit. Ut luctus sodales nunc nec dignissm vitae congue odio. Suspendisse luctus ultrices eros, et iaculis risus mollis nec. Duis id ante mi tempus vulputate ut eget quam. Etiam commodo laoreet purrus sit amet scelerrisque. Curabitur consequat euismod. Morbi mi mauris, commodo sed dignissm vitae, consectur ut arcu. Integer ☐ Checking this box constitutes (i) my consent to receipt of electronic disclosures in accordance with the Consent to Electronic Documents above; (ii) my acknowledgement and consent to the Acknowledgement of Rights disclosure above; and (iii) my legally binding agreement to the service Contract above. I acknowledge that this service is provided by Provider Corporation. I consent to allow Credit Monitoring Corporation to provide my registration and credit report information to Provider Corporation for the purposes of this service.

[Continue]
610

How Does It Work?

① Choose a service, schedule your appointment, and complete your order.

② You'll receive an email confirmation with instructions and documents.

③ Your Advisor will review your Experian Credit Report, and call you when it's time for your appointment.

Customer Support

Call Toll-Free: %%PHONE%%
Phone Hours (PST)
Mon - Fri from 6am - 6pm
Sat - Sun from 8am - 5pm

Security

Experian Credit Advisors and iQual are committed to protecting your information and privacy. All communications are secure and confidential.

You may cancel this contract without penalty or obligation at any time before midnight of the 3rd business day after the date on which you signed the contract. See the attached notice of cancellation form for an explanation of this right

Choose My Service  Schedule My Appointment  Accept Legal Terms  Submit My Order

Submit My Order
Please review the purchase receipt and payment information below.

Purchase Receipt
Name: Joe Consumer
Transaction Date: %%DATE%%
Service: Quick Report Q&A - $19.95
Total Cost: $19.95

Payment Information
Your credit card won't be charged until after the services you've ordered are fully provided. If you have additional questions about our policies, including our refund policy, refer to our Service Contract.

Name on Card: Joe Consumer
Billing Address: 18500 Von Karman, Irvine, CA 92614
Credit or Debit Card: XXXX-XXXX-XXXX-1234
Expiration Date: 12/01/2010

⊙ Edit Payment Information

Edit Payment Information
Name on Card: Joe Consumer
Billing Address: 18500 Von Karman
City, State, Zip: Irvine | CA | 92614
Credit or Debit Card: XXXX-XXXX-XXXX-1234
Expiration Date: December | 01 | 2010
CVV2: 123

Submit Secure Order

How Does It Work?
1. Choose a service, schedule your appointment, and complete your order.
2. You'll receive an email confirmation with instructions and documents.
3. Your Advisor will review your Experian Credit Report, and call you when it's time for your appointment.

Customer Support
Call Toll-Free: %%PHONE%%
Phone Hours (PST)
Mon - Fri from 6am - 6pm
Sat - Sun from 8am - 5pm

Security
Experian Credit Advisors and iQual are committed to protecting your information and privacy. All communications are secure and confidential.

700

ONLINE REGISTRATION SYSTEM FOR CROA-COMPLIANT CREDIT ADVICE SERVICES

CROSS-REFERENCE TO RELATED APPLICATION

This application claims the benefit of priority under 35 U.S.C. §119(e) of U.S. Provisional Application No. 61/361,332, filed Jul. 2, 2010 and titled ONLINE REGISTRATION SYSTEM FOR CROA-COMPLIANT CREDIT ADVICE SERVICES, the disclosure of which is hereby incorporated by reference in its entirety into this application.

BACKGROUND

Credit advice services include various types of services. For example, credit advice service providers may assist consumers in interpreting their credit reports and provide consumers advice on how to improve their credit scores, general education on credit scores, and other related services. The Credit Repair Organizations Act (CROA) is a federal law that governs the manner in which credit counseling service providers provide credit counseling services to consumers. Various states may have their own versions of CROA that impose additional requirements on the credit counseling service providers.

SUMMARY OF THE DISCLOSURE

Embodiments of the invention are directed to systems and methods for establishing a relationship between consumers and credit repair service providers and/or providing credit advice, credit repair, counseling, credit education and/or credit advice services in a legally compliant manner, such as in compliance with the federal Credit Repair Organizations Act (CROA) and/or equivalent state consumer laws/regulations.

BRIEF DESCRIPTION OF THE DRAWINGS

Specific embodiments of the invention will now be described with reference to the following drawings, which are intended to illustrate embodiments of the invention, but not limit the invention:

FIG. 4 shows a sample user interface of the credit advice service sign-up module in accordance with one embodiment.

FIG. 6 shows a sample user interface of the credit advice service sign-up module in accordance with one embodiment.

FIG. 7 shows a sample user interface of the credit advice service sign-up module in accordance with one embodiment.

DETAILED DESCRIPTION OF PREFERRED EMBODIMENTS

Embodiments of the invention will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

System Implementation

Figure 1A:
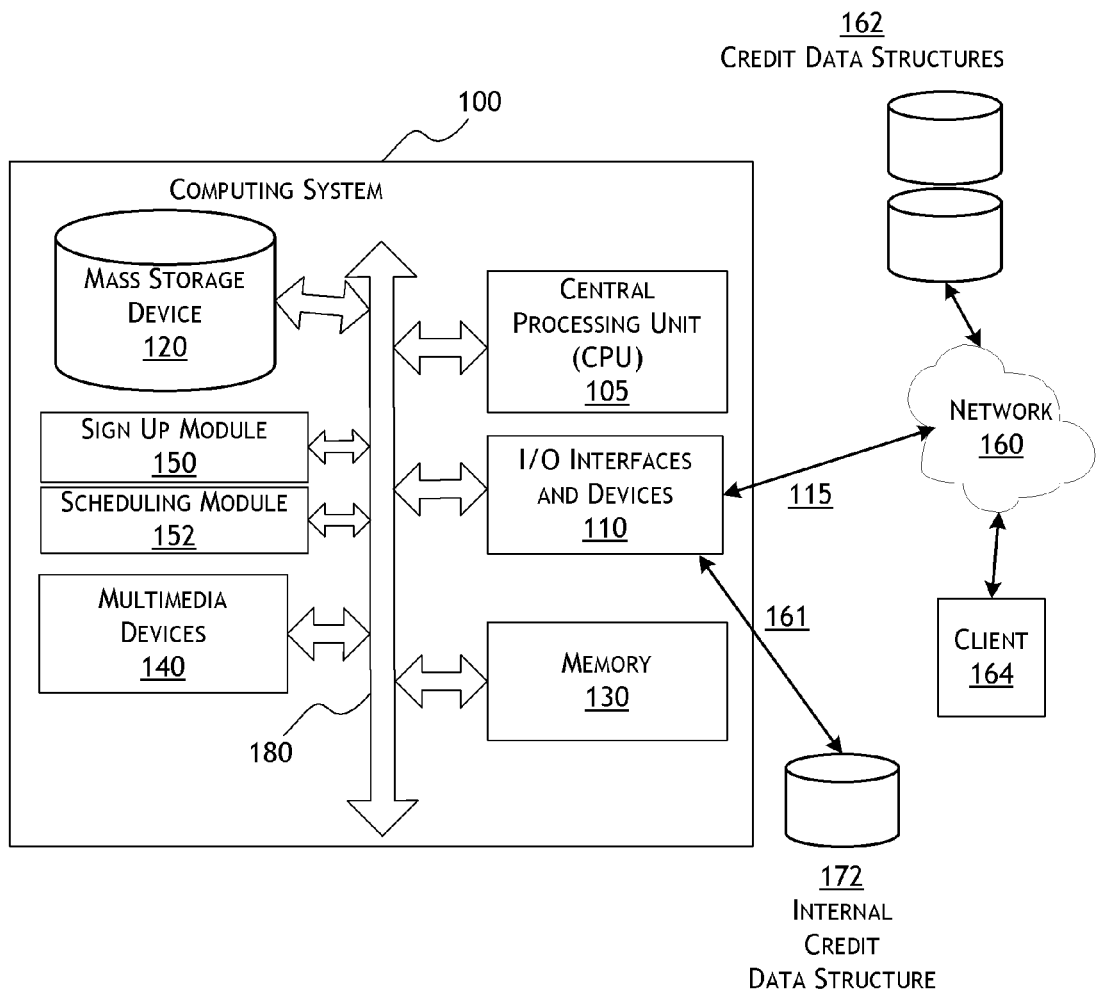
FIG. 1A is a block diagram of a computing system for registering consumers for provision of credit advice services according to one embodiment.

FIG. 1A is a block diagram showing an embodiment in which a computing system 100 is in communication with a network 160 and various systems are also in communication with the network 160. The computing system 100 may be used to implement systems and methods described herein. For example, the computing system 100 may be configured to provide a sign-up interface for credit advice services and manage interactions between a user and a provider of such services. Although the description provided herein refers to individuals, consumers, or customers, the terms "user," "individual," "consumer," and "customer" should be interpreted to include groups of individuals, such as, for example, married couples or domestic partners, organizations, groups, and business entities.

The computing system 100 includes, for example, a personal computer that is IBM, Macintosh, or Linux/Unix compatible or a server or workstation. In one embodiment, the computing system 100 comprises a server, a laptop computer, a cell phone, a personal digital assistant, a kiosk, or an audio player, for example. In one embodiment, the exemplary computing system 100 includes one or more central processing unit ("CPU") 105, which may each include a conventional or proprietary microprocessor. The computing system 100 further includes one or more memory 130, such as random access memory ("RAM") for temporary storage of information, one or more read only memory ("ROM") for permanent storage of information, and one or more mass storage device 120, such as a hard drive, diskette, solid state drive, or optical media storage device. Typically, the modules of the computing system 100 are connected using a standard based bus system 180. In different embodiments, the standard based bus system could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of computing system 100 may be combined into fewer components and modules or further separated into additional components and modules.

The computing system 100 is generally controlled and coordinated by operating system software, such as Windows XP, Windows Vista, Windows 7, Windows Server, Unix, Linux, SunOS, Solaris, or other compatible operating systems. In Macintosh systems, the operating system may be any available operating system, such as MAC OS X. In other embodiments, the computing system 100 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary computing system 100 may include one or more commonly available input/output (I/O) devices and interfaces 110, such as a keyboard, mouse, touchpad, and printer. In one embodiment, the I/O devices and interfaces 110 include one or more display devices, such as a monitor, that allows the visual presentation of data to a user. More particularly, a display device provides for the presentation of GUIs, application software data, and multimedia presentations, for example. The computing system 100 may also include one or more multimedia devices 140, such as speakers, video cards, graphics accelerators, and microphones, for example.

In the embodiment of FIG. 1A, the I/O devices and interfaces 110 provide a communication interface to various external devices. In the embodiment of FIG. 1A, the computing system 100 is electronically coupled to a network 160, which comprises one or more networks, such as one or more of a LAN, WAN, and/or the Internet, for example, via a wired, wireless, or combination of wired and wireless, communication link 115. The network 160 communicates with various computing devices and/or other electronic devices via wired or wireless communication links.

According to FIG. 1A, information is provided to the computing system 100 over the network 160 from one or more data sources including, for example, credit data structures 162. The information supplied by the various data sources may include credit data, demographic data, application information, product terms, accounts receivable data, financial statements, and/or other like data, for example. In addition to the devices that are illustrated in FIG. 1A, the network 160 may communicate with other data sources or other computing devices. In addition, the data sources may include one or more internal and/or external data sources. In some embodiments, one or more of the data structures or data sources may be implemented using a relational database, such as Sybase, Oracle, CodeBase and Microsoft® SQL Server as well as other types of data structures such as, for example, a flat file data structure, an entity-relationship data structure, an object-oriented data structure, and/or a record-based data structure.

A client computer 164 may be connected to the network 160 and used by a user to exchange information with the computing system 100. For example, the client computer 164 may be used to transmit information related to a sign-up request for credit advice service, and the computing system 100 may respond to the information received from the client computer 164 by providing user interface elements for display to a user of the client computer 164 to facilitate the sign-up process. The client computer 164 may be a desktop computer, a mobile computer, or any other mobile device such as a mobile phone or other similar handheld computing devices. The client computer 164 may include the same or similar components to those discussed above with reference to the computing system 100.

In one embodiment, the I/O devices and interfaces 110 further provide a communication interface to an internal credit data structure 172. In the embodiment of FIG. 1A, the computing system 100 is coupled to a secured network 161, such as a secured LAN, for example. The system communicates with the internal credit data structure 172 through the secured network 161. In some embodiments, the internal credit data structure 172 is configured to communicate with additional computing devices over the network 160 or some other network, such as a LAN, WAN, or the Internet via a wired, wireless, or combination of wired and wireless, communication link.

In the embodiment of FIG. 1A, the computing system 100 also includes a sign-up module 150 and a scheduling module 152 that may be stored in the mass storage device 120 as executable software codes that are executed by the CPU 105. These modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 1A, the computing system 100 is configured to execute the sign-up module 150 and scheduling module 152 among others, in order to handle various aspects for the sign-up process for credit advice services in a CROA-compliant manner.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the computing system 100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Figure 1B:
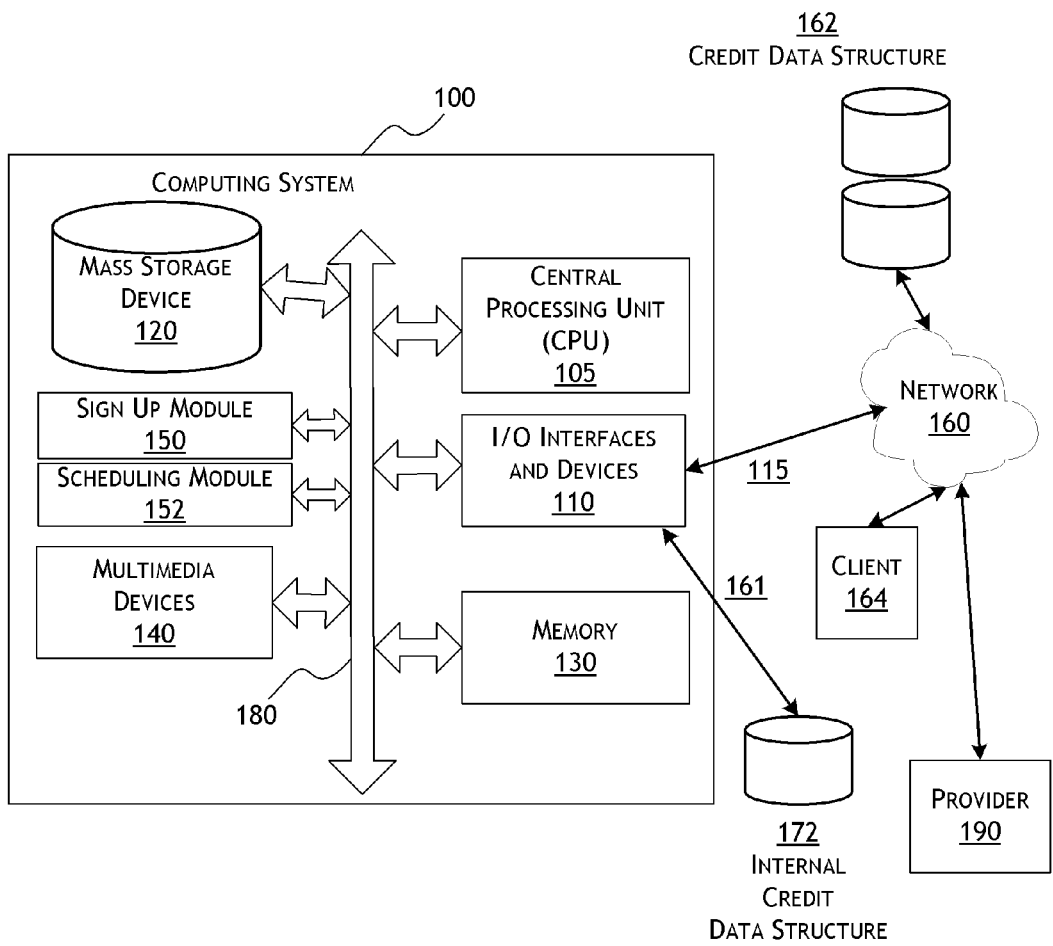
FIG. 1B is a block diagram of the computing system of FIG. 1A in communication with devices including a provider of credit advice services according to one embodiment.

FIG. 1B is a block diagram of the computing system 100 in communication with various devices, including a provider of credit advice services. In one embodiment, FIG. 1B is similar to FIG. 1A except that FIG. 1B additionally includes a provider computing system 190 that may be used by a provider in providing credit advice services. In one embodiment, the provider computing system 190 is connected via the network 160 to the client computer 164 and the computing system 100. The provider computing system 190 may include the same or similar components to those discussed above with reference to the computing system 100. The computing system 100 as shown in FIG. 1B may be used to coordinate provision of credit advice services provided through the provider computing system 190 to a user using the client computer 164. In one embodiment, the various modules of the computing system 100 are configured to provide data collected from the user (e.g. through the client computer 164) to the provider computing system 190 and vice versa, and coordinate the provision of credit advice services as further described below. For example, the sign-up module 150 and the scheduling module 152 of the computing system 100 may initially handle the sign-up and scheduling functionalities on behalf of the service provider. In one embodiment, once the initial sign-up is completed and the first counseling session is scheduled, the service provider is then tasked with providing the actual services to the user. In another embodiment, credit advise services are provided by the same entity that controls scheduling of the credit advise services, such as the entity that controls operations of the scheduling module 152 and/or sign-up module 150, Sign-Up and Scheduling Modules In one embodiment, upon a user request, a user's credit report is accessed and/or generated by the computing system 100 by accessing one or more data sources mentioned above. In one embodiment, the credit report is sent to the client computer 164 for display.

Figure 2:
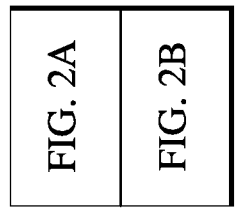
FIG. 2 shows a sample user interface that includes credit information of a consumer and a promotional link to a user interface of a credit advice service sign-up module in accordance with one embodiment.

FIG. 2 shows a sample advertisement 210 that may be as part of a credit report user interface 200 that is provided to the client computer 164. The credit report user interface 200 may be provided as part of a credit monitoring service or other credit information query. Thus, in one embodiment the consumer may be able to sign-up for credit repair counseling as an add-on service to already existing services, such as credit monitoring services. For example, a consumer that already has a credit monitoring account may easily enroll in a credit repair counseling service using the personal information already stored by the provider of the credit monitoring service. In this way, the information that is required for enrollment in the credit monitoring service can be reduced because much of the registration information (e.g., name, address, etc.) is already known by the credit monitoring service.

In one embodiment, the advertisement 210 links to a user interface generated by the sign-up module 150. In addition to transmitting the credit report data for display, the computing system 100 may store the credit data (e.g., a credit report of the consumer or individual credit data items) so it can be accessed by a credit advice service provider (e.g., provider computing system 190 of FIG. 1B) when it provides credit advice services to the user. In other embodiments, the user can access the user interfaces provided by the sign-up module 150 by directly inputting a Uniform Resource Locator (URL) address into a web browser, by responding to an electronically sent invitation (e.g. sent via email, text message, etc.), or by selecting links provided on other websites (such as the advertisement 210).

Figure 3:
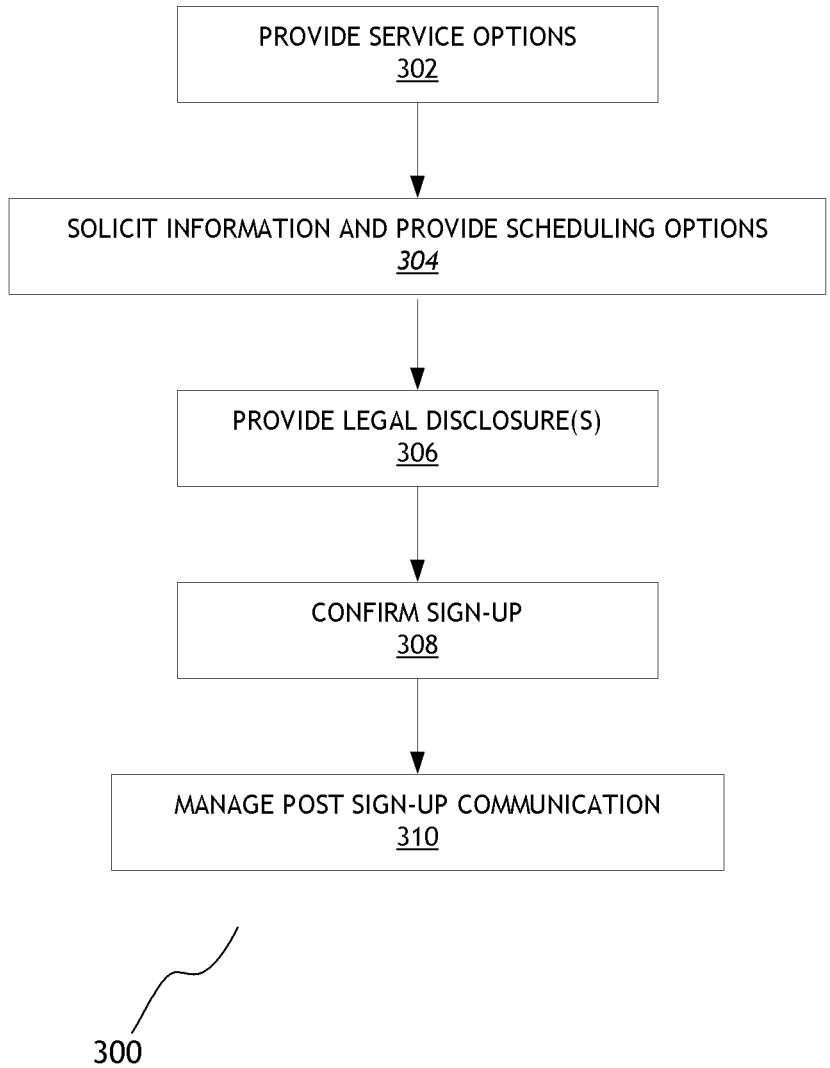
FIG. 3 is a flow chart showing a sign-up process provided by the credit advice service sign-up module of the computing system shown in FIGS. 1A and 1B in accordance with one embodiment.

FIG. 3 is a flowchart illustrating one embodiment of sign-up process, such as may be provided by the sign-up module 150. Depending on the embodiment, the method of FIG. 3 may include fewer or additional blocks and/or the blocks may be performed in a different order than is illustrated. For ease of explanation, the method will be described herein as performed by the computing system 100 and, more specifically, by various software modules executing on system 100; however, the method may be performed by any other suitable computing devices.

In block 302, the sign-up module may provide a user interface listing credit advice service options that are selectable by the user. After the user selects an option, in block 304, the sign-up module may solicit information from the user to be used in the selected credit advice services and provide scheduling options to the user. The solicited information may include the type of credit-related questions the user wants answered during the counseling services.

In block 306, the sign-up module may provide one or more user interfaces with legal disclosures, the receipt of which the user can acknowledge with an interactive user interface element. In block 308, the sign-up module may confirm the sign-up and provide a confirmation to the user. In block 310, the sign-up module may manage post sign-up communication with the user. Each of the blocks will be further described below.

FIG. 4 shows a sample user interface 400 that may be provided by the sign-up module 150 in block 302 according to one embodiment. As shown, the user interface 400 provides credit advice service options that include, for example, a credit question and answer session, a credit assessment session, and a credit analysis and coaching session. In one embodiment, the service options are displayed with detailed information along with the prices. The user can indicate his or her selection in the user interface 400. In one embodiment, the service options are structured to meet the CROA requirements in that advice services are provided on a per-session basis. For example, one service option provides a pay-by-the-call model in which the advice service is provided to the user through an individual call session and the user is billed after the completion of the call session. Various service options and payment structures may be provided in different implementations.

Figure 5:
FIG. 5 shows a sample user interface of the credit advice service sign-up module in accordance with one embodiment.

FIG. 5 shows a sample user interface 500 that may be provided by the sign-up module 150 (e.g., in block 304 of FIG. 3) according to one embodiment. In one embodiment, the user interface 500 includes a scheduler 520 that is provided by the scheduling module 152. The scheduler 520 may allow the user to select one or more time periods for receiving the selected credit advice services (e.g. credit advice session). For example, the schedule 520 may populate the preferred data and preferred time fields with only those day/time slots for which a credit counselor is available to speak with the consumer. In other embodiments, other user interface elements and interfaces may be used to allow the consumer to select a day/time for the first counseling session.

The scheduling module 152 in one embodiment includes logic that ensures that the first counseling session is scheduled at least a certain number of days after the user signs up to meet the minimum waiting period required by CROA and/or any state equivalent law or regulation. The state of residence of the consumer may be provided by the consumer as part of a sign-up process for credit repair counseling. Alternatively, the state of residence may be accessed from consumer information that is stored with the consumer's credit monitoring (or other) account. In other embodiments, the consumer's state of residence may be determined using geolocation information, such as a geolocation of the consumer's computing device that is determined by any available geolocation methods (e.g. mapping an IP address of the consumer's computing device to a geographic location). In one embodiment, a state of residence provided by the consumer may be confirmed by geolocation data. In another embodiment, a state of residence determined using geolocation data may be confirmed by the consumer.

Based on the logic provided by the scheduling module 152, the scheduler 520 may display only available days/times that are after the expiration of the initial waiting period. In one embodiment, the minimum waiting period required by the CROA is three days. In other embodiments, the minimum waiting period is extended to meet the minimum required by a law or regulation of the state in which the user resides. The number of days may be adjusted to reflect changes in the legal requirements. For example, a consumer in a state that doesn't have credit counseling scheduling limitations may be able to set up a first counseling session for a time just after the CROA required delay (e.g., three days from the consumer's sign-up in the counseling service). However, a consumer in another state that requires a five day waiting period would not be provided with scheduling options that include days/times within five days of the consumer's sign-up in the counseling service. Thus, the scheduler 320 advantageously reduces the risk of scheduling a credit counseling session at a time that is not appropriate under CROA and/or relevant state regulations.

The user interface 500 may also include an information collection section 530 that collects contact information (e.g. phone number) and/or other personal information of the user. In one embodiment, after the user selects an available counseling date/time, the scheduling module 152 automatically adds the session to the calendar of the assigned credit counselor. The assigned credit counselor may also receive, from the scheduling module 152 and/or the sign-up module 150, other user information collected by the user interface 500 and/or information associated with the consumer that is accessed from other data sources, such as credit data.

The user interface 500 in one embodiment may allow the user to select one or more pre-generated descriptions 510 of the user's credit issue(s), so that the assigned credit counselor is informed of the general nature of the user's issue(s) prior to the first session. For example, the pre-generated descriptions 510 may include the most common credit issues that are raised with the credit counseling provided. In one embodiment, the pre-generated descriptions 510 are periodically updated to provide the most current issues facing consumer. Such updates may be performed automatically by a computing system in response to analysis of information provided by credit counselors, for example. In one embodiment, the consumer may be provided with a text entry field where a question that is not directly addressed by one of the pre-generated descriptions 510 may be provided, or other information that may be helpful for credit counseling may be provided.

FIG. 6 shows a sample user interface 600 provided by the sign-up module 150 (such as in block 306 of FIG. 3) according to one embodiment. The user interface 600 in one embodiment displays a consent to electronic documents area 620, an acknowledgement of rights area 630, and a service contract area 640. In the embodiment of FIG. 6, consents associated with the information provided in all of the areas 620, 630, 640 may be provided concurrently by selection of the checkbox 610. Accordingly, the process of accepting the various conditions described in areas 620, 630, 640 can be easily provided.

The consent to electronic documents area 620 includes information regarding provision of documents related to credit counseling in electronic format, such as via network accessible document, email, text messages, etc. The acknowledgement of rights are 630 provides terms and conditions mandated by the CROA and/or state law equivalents. In one embodiment, the terms and conditions are customized based on various attributes of the user, such as the user's state of residence. For example, the terms and conditions may include the standard CROA terms and conditions and also include state-specific credit repair terms and conditions. In one embodiment, the terms and conditions are automatically updated by the sign-up or scheduling modules 150, 152 based on the relevant attributes of the consumer (e.g., state of residence). The service contract area 640 provides information regarding the agreement between the consumer and the credit counseling provided. The service contract may include information requesting the user's consent to share the user's information with a third party (e.g. a credit bureau and/or credit counseling provider).

In this embodiment, the user is provided with the terms, conditions, and other legal language within the user interface 600 and is able to verify receipt of and agreement with those terms, conditions, and legal language by electronic signature. The electronic signature may be effected with a user interface element (shown as a checkbox 610 in FIG. 6) and/or by the user uploading a secure signature file. In one embodiment, the user interface 600 includes an additional user interface element (another checkbox) to allow the user to agree to conduct all transactions with the credit advice service provider electronically (e.g. receiving documents via emails) and use electronic signatures. For example, in one embodiment the user may first be required to selected a checkbox (or other user interface element) agreeing to receive information associated with credit advice and sign electronically, and after providing the electronic communication and signature consent the user can then agree to the terms and conditions that are electronically displayed. In one embodiment, the user can indicate agreement to (1) use electronic communication and signature and (2) the displayed CROA terms and conditions together. For example, the user may indicate agreement to both through checking a checkbox (e.g. checkbox 610) displayed in the user interface 600. The same checkbox may also be used to provide consent to a service contract of the credit counseling provider, such as those in service contract area 640.

FIG. 7 illustrates a sample user interface 700 provided by the sign-up module 150 in block 308 according to one embodiment. As shown, the user interface 700 shows an order summary of the selected credit advice services. As discussed above, the sign-up module 150 provides customization based on state law CROA equivalents such that additional terms and conditions may be provided based on the user's state of residency. In one embodiment, the state of residency of the user is determined by the billing address provided by the user as part of the sign-up process. In one embodiment, the user may be asked to select his or her state of residency with a user interface element (e.g. a drop-down list). In some embodiments, the state of residency may be determined using geo-location data associated with the consumer's computing device. In other embodiments, the state of residency provided by the consumer may be verified using geo-location data and/or other data associated with the consumer (e.g., residence information included in credit data).

As shown in block 310 of FIG. 3, the sign-up module 150 may also manage communication with the user after the sign-up is completed. In one embodiment, after the sign-up, the sign-up module 150 sends the user, or provides the user a link to, a copy of the displayed, CROA-mandated disclosure, service contract (terms and conditions), and/or cancellation forms in duplicates. The cancellation forms may be used by the user to cancel services for which the user has signed up. In one embodiment, the sign-up module appends any state-law mandated additional terms and conditions to the CROA-mandated disclosure. In one embodiment, the disclosures and forms (or link(s) to them) are electronically transmitted via email to the user, with the disclosures and forms provided in Portable Document Format (PDF), or any other suitable file format. In another embodiment, the forms and disclosures are stored in a networked computer system and made accessible to the user via an online interface, such as an interface that is accessible from a website in which the user views a credit report. For example, the forms and disclosure may be available via user interfaces of a credit monitoring service of which the consumer is a member. In one embodiment, the sign-up module 150 also manages any user response to the sent disclosures and forms and sends reminders of the scheduled counseling sessions to the user.

In other embodiments, additional aspects of the systems and methods discussed herein may be customized based on the state of residence of the consumer. For example, a listing of consumer rights provided during the enrollment process may be customized based on the state of residence of the consumer.

During a credit counseling sessions, such as the initial or any subsequent counseling sessions, the user and the credit counselor may advantageously have access to the same reference documents, such as credit information that is retrieved from one or more credit bureaus. For example, rather than the user viewing a version of the user's credit report that may be weeks or months old, while the credit counselor is viewing a version of the credit report that was generated minutes or hours prior to the counseling session, the computing system 100 is configured to provide both counselor and user with access to a same version of the credit report. For example, the user may access the credit report via a web interface, while the counselor accesses the same credit report via the same web interface, a different web interface, or a standalone software application. In this way, the credit counselor is better able to step through portions of the credit report with the user, and to direct the consumer to particular portions of the credit report, since both parties are viewing the same credit report. In some embodiments, the actual user interfaces (e.g., the credit report) are separately generated by the user computing system and the credit counselor computing system, but are based on the same version of credit data that is made accessible to each system by the computing system 100.

In one embodiment, other financial information is provided to both the user and the credit counselor in a manner that allows both parties to view the same documents and/or same version of information. For example, a monthly credit statement, that includes a summary of the users credit score (e.g., open account totals, debt totals, etc.), factors affecting the credit score, and alerts that have triggered over the last 30 days, may be provided to both the user and the credit counselor. The same data associated with such reports may be provided to both parties such that each party is viewing the same information. In one embodiment, each party generates a user interface in a common format using the same data.

Depending on the embodiment, the credit counselor may have access to the provided information (e.g., the user's credit report or monthly credit statement) for a limited period of time, such as 30, 60, or 90 minutes. In some embodiments, the credit data of the user (e.g., the user's credit report or monthly credit statement) is not saved by the credit counselor, and in some embodiments the software used by the credit counselor to view the credit data may include features that prevent the counselor from storing, printing, or using the credit data in any manner other than viewing the data for purposes of the credit counseling session.

SUMMARY

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by an Information Display Computing Device and/or any other suitable computing device. The methods may be executed on the computing devices in response to execution of software instructions or other executable code read from a tangible computer readable medium. A tangible computer readable medium is a data storage device that can store data that is readable by a computing system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer-implemented method of registering a consumer for credit repair counseling, the computer-implemented method comprising:

receiving information identifying a consumer via a network accessible user interface;

determining a state of residence of the consumer;

providing by a computing system comprising one or more processors, to a consumer computing device operated by the consumer a user interface including information requesting consent from the consumer to receive documents regarding credit repair counseling electronically and information regarding terms and conditions of the credit repair counseling;

determining a state mandated minimum delay period associated with the determined state of residence of the consumer;

determining, by the computing system, a minimum delay period based on the greater of a federally mandated minimum delay period and the state mandated minimum delay period;

determining, by the computing system, available dates and times for a first counseling session of the consumer with a credit repair counselor, wherein the available dates are determined such that the first counseling session is scheduled at least a certain number of days after the customer signs up for the credit repair counseling to meet the determined minimum delay;

transmitting, by the computing system, to the consumer computing device, the available dates and times for the first counseling session.

2. The computer-implemented method of claim 1, further comprising:

receiving an electronic signature of the consumer indicating acceptance of the terms and conditions.

3. The computer-implemented method of claim 1, wherein said transmitting further comprises transmitting electronic cancellation forms usable by the consumer to cancel credit repair counseling.

4. The computer-implemented method of claim 3, wherein the electronic copies of the terms and conditions of the credit repair counseling and the electronic copies of the cancellation forms are transmitted together.

5. The computer-implemented method of claim 4, wherein the electronic copies of the terms and conditions of the credit repair counseling and the electronic copies of the cancellation forms are transmitted in a single electronic communication.

6. The computer-implemented method of claim 1, wherein the state of residence is provided by the consumer.

7. The computer-implemented method of claim 1, wherein the state of residence is determined based on geolocation information associated with the consumer computing device.

8. The computer-implemented method of claim 1, further comprising receiving via the user interface, first consent from the consumer to provide documents regarding credit repair counseling electronically and second consent to the terms and conditions for credit repair counseling, wherein the first and second consents are provided via a single electronic signature or a selection of a single user interface element.

9. The computer-implemented method of claim 8, wherein the user interface is configured to concurrently display at least a portion of a first agreement to which the consumer provides the first consent and at least a portion of a second agreement to which the consumer provides the second consent, wherein the single user interface element is a checkbox.

10. The computer-implemented method of claim 1, further comprising:

providing to the consumer computing device a second user interface that indicates a plurality of potential credit repair related topics, wherein the credit repair related topics are individually selectable.

11. The computer-implemented method of claim 9, further comprising:

providing any selected credit repair related topics to a credit repair counselor that is assigned to speak with the consumer.

12. The computer-implemented method of claim 9, wherein the second user interface includes a drop-down menu that lists the plurality of potential credit repair related topics.

13. The computer-implemented method of claim 1, wherein at least some of the terms and conditions are based on the Credit Repair Organizations Act.

14. The computer-implemented method of claim 13, wherein at least some of the terms and conditions are based on credit repair laws or regulations of the determined state of residence.

15. A computing system comprising:

one or more hardware processors configured to execute software code in order to cause the computing system to:
receive information identifying a consumer via a network accessible user interface;
determine a state of residence of the consumer;
provide to a consumer computing device operated by the consumer a user interface including information requesting consent from the consumer to receive documents regarding credit repair counseling electronically and information regarding terms and conditions of the credit repair counseling;
determine a minimum delay period based on the greater of a federally mandated minimum delay period and a state mandated minimum delay period, wherein the state mandated minimum delay period is associated with the determined state of residence of the consumer;
determine available dates and times for a first counseling session of the consumer with a credit repair counselor, wherein the available dates are after the minimum delay period;
transmit to the consumer computing device, the available dates and times for the first counseling session.

16. The computing system of claim 15, wherein the one or more hardware processors are further configured to execute software code in order to cause the computing system to transmit electronic cancellation forms usable by the consumer to cancel credit repair counseling.

17. The computing system of claim 16, wherein the information regarding terms and conditions of the credit repair counseling and the electronic copies of the cancellation forms are transmitted together.

18. The computing system of claim 17, wherein the information regarding terms and conditions of the credit repair counseling and the electronic copies of the cancellation forms are transmitted in a single electronic communication.

19. A non-transitory tangible computer readable medium storing software code configured for execution by a computing device in order to cause the computing device to perform operations comprising:

receiving information identifying a consumer via a network accessible user interface;
determining a state of residence of the consumer;
determining a minimum delay period based on the greater of a federally mandated minimum delay period and a state mandated minimum delay period, wherein the state mandated minimum delay period is associated with the determined state of residence of the consumer;
determining available dates and times for a first counseling session of the consumer with a credit repair counselor, wherein the available dates are after the minimum delay period;
transmitting to a consumer computing device, the available dates and times for the first counseling session.

20. The non-transitory tangible computer readable medium of claim 19, wherein the operations further comprise:

providing to the consumer computing device a user interface that indicates a plurality of potential credit repair related topics, wherein the credit repair related topics are individually selectable.

21. The non-transitory tangible computer readable medium of claim 20, wherein the operations further comprise:

providing any selected credit repair related topics to a credit repair counselor that is assigned to speak with the consumer.

* * * * *

UNITED STATES PATENT AND TRADEMARK OFFICE
CERTIFICATE OF CORRECTION

| | | |
|---|---|---|
| PATENT NO. | : 8,606,694 B2 | Page 1 of 1 |
| APPLICATION NO. | : 13/175712 | |
| DATED | : December 10, 2013 | |
| INVENTOR(S) | : Campbell et al. | |

It is certified that error appears in the above-identified patent and that said Letters Patent is hereby corrected as shown below:

References Cited

In column 2 (title page 2, item 56) at line 6, Under Other Publications, change "worksjour" to --works/our--.

In the Drawings

Sheet 4 of 10 (FIG. 2A) at line 17, Change "Prduct" to --Product--.

Figure 2B:

Sheet 5 of 10 (FIG. 2B) at line 2, Change "assesing" to --assessing--.

In the Specification

In column 5 line 6, Change "150," to --150.--.

In column 7 line 64, Change "and" to --an--.

In column 7 line 66, Change "effected" to --affected--.

In the Claims

In column 11 line 14, In Claim 4, change "and the" to --and--.

In column 11 line 44, In Claim 11, change "claim 9," to --claim 10,--.

In column 11 line 49, In Claim 12, change "claim 9," to --claim 10,--.

In column 12 line 27 (approx.), In Claim 17, change "and the" to --and--.

Signed and Sealed this
Twenty-fourth Day of June, 2014

Michelle K. Lee
*Deputy Director of the United States Patent and Trademark Office*